(12) United States Patent
Mayginnes et al.

(10) Patent No.: US 9,288,685 B2
(45) Date of Patent: Mar. 15, 2016

(54) METHOD AND SYSTEM FOR OPERATING A RADIO NETWORK CONTROLLER IN A WIRELESS COMMUNICATION SYSTEM

(71) Applicant: MOTOROLA SOLUTIONS, INC, Schaumburg, IL (US)

(72) Inventors: Kevin B Mayginnes, Schaumburg, IL (US); Bradley M Hiben, Glen Ellyn, IL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 295 days.

(21) Appl. No.: 14/092,021

(22) Filed: Nov. 27, 2013

(65) Prior Publication Data

US 2015/0146529 A1    May 28, 2015

(51) Int. Cl.

| | |
|---|---|
| *H04W 16/14* | (2009.01) |
| *H04W 72/08* | (2009.01) |
| *H04W 52/24* | (2009.01) |
| *H04L 5/00* | (2006.01) |
| *H04W 72/04* | (2009.01) |
| *H04W 28/08* | (2009.01) |

(52) U.S. Cl.
CPC ............ *H04W 16/14* (2013.01); *H04W 72/085* (2013.01); *H04L 5/006* (2013.01); *H04L 5/0089* (2013.01); *H04W 28/085* (2013.01); *H04W 52/241* (2013.01); *H04W 72/0453* (2013.01)

(58) Field of Classification Search
CPC . H04W 72/085; H04W 16/14; H04W 28/085; H04W 72/0453; H04W 52/24; H04W 52/241; H04L 5/0089; H04L 5/006
See application file for complete search history.

(56) References Cited

U.S. PATENT DOCUMENTS 5,719,871 A *  2/1998  Helm ........................ H04L 1/06
                                                                370/328
8,374,226 B2 *  2/2013  Tzannes ................ H04L 5/0007
                                                                375/222

(Continued)

FOREIGN PATENT DOCUMENTS

WO        2013035959 A1      3/2013

OTHER PUBLICATIONS

Kitagami, S. et al.,"Method of Autonomic Load Balancing for Long Polling in M2M Service System", 26th International Conference on Advanced Information Networking and Applications Workshops (WAINA), Mar. 26-29, 2012, pp. 294-299.

(Continued)

*Primary Examiner* — Parth Patel
*Assistant Examiner* — Kai Chang
(74) *Attorney, Agent, or Firm* — Kenneth A. Haas

(57) ABSTRACT

A method and a system for operating a radio network controller (RNC) in a wireless communication system. The RNC generates a group database comprising a plurality of transmitting groups and a resultant Signal to Interference plus Noise Ratio (SINR) associated with the transmissions received from each member within each transmitting group meets a pre-defined SINR threshold. The RNC tests the received SQMs associated with a new transmitting subscriber unit with the resultant SINR associated with each transmitting group to assign the new subscriber unit to at least one transmitting group on determining that the new transmitting subscriber unit could be added to the at least one transmitting group without reducing a resultant SINR associated with the at least one transmitting group below the pre-defined SINR threshold.

20 Claims, 10 Drawing Sheets

(56) References Cited

U.S. PATENT DOCUMENTS

| | | | |
|---|---|---|---|
| 2003/0134655 A1* | 7/2003 | Chen | H04L 12/1877 455/522 |
| 2006/0064400 A1* | 3/2006 | Tsukerman | G06F 17/30575 |
| 2008/0239938 A1* | 10/2008 | Jalloul | H04L 5/023 370/201 |
| 2009/0196362 A1* | 8/2009 | Song | H04B 7/0408 375/260 |
| 2009/0279701 A1* | 11/2009 | Moisand | H04L 12/185 380/270 |
| 2010/0265913 A1* | 10/2010 | Gorokhov | H04W 36/0055 370/331 |
| 2011/0076962 A1* | 3/2011 | Chen | H04L 5/001 455/68 |
| 2011/0319122 A1* | 12/2011 | Zhou | H04W 52/146 455/522 |
| 2012/0064932 A1 | 3/2012 | Lim et al. | |
| 2012/0327804 A1* | 12/2012 | Park | H04W 52/146 370/252 |
| 2013/0016649 A1* | 1/2013 | Damnjanovic | H04W 88/04 370/315 |
| 2013/0021932 A1* | 1/2013 | Damnjanovic | H04W 52/0229 370/252 |
| 2013/0029716 A1 | 1/2013 | Lee et al. | |
| 2013/0046841 A1 | 2/2013 | Park et al. | |
| 2014/0105040 A1* | 4/2014 | Baker | H04W 52/367 370/252 |

OTHER PUBLICATIONS

Ko, K. S. et al.,"A Novel Random Access for Fixed-Location Machine-to-Machine Communications in OFDMA Based Systems", IEEE Communications Letters, vol. 16, No. 9, Sep. 2012, pp. 1428-1431.

Prautzsch, F. et al.,"Commercial SATCOM in support of protected connectivity for the Warfighter and the First Responder," IEEE, The 2011 Military Communications Conference—Track 6—Department of Defense Programs, Nov. 7-10, 2011, pp. 2296-2301.

* cited by examiner

400

| SQM DATABASE | | | | | |
|---|---|---|---|---|---|
| | R1 | R2 | R3 | R4 | R5 |
| SU1 | -67.6 | -89.5 | -110.9 | -89.8 | -107.7 |
| SU2 | -96.7 | -89.6 | -92.3 | -112.8 | -80.6 |
| SU3 | -107.0 | -102.5 | -96.5 | -101.3 | -96.4 |
| SU4 | -104.6 | -92.8 | -105.8 | -82.2 | -103.2 |
| SU5 | -88.9 | -101.9 | -109.9 | -92.1 | -117.9 |
| SU6 | -85.8 | -91.3 | -76.8 | -82.8 | -88.5 |

| GROUP DATABASE | | | |
|---|---|---|---|
| G1 | SU1 | SU2 | SU6 |
| G2 | SU3 | SU5 | |
| G3 | SU4 | | |

*FIG. 5*

UPLINK SLOT TYPE (UST): {RANDOM ACCESS | GROUP POLLING | RESOURCE RESERVATION MULTIPLE ACCESS}
UPLINK SLOT FORMAT (USF): {ONE SLOT | TWO SLOTS | THREE SLOTS | FOUR SLOTS}
ID: {SYSTEM ID | GROUP ID | INDIVIDUAL MAC ID}
DOWNLINK ACKNOWLEDGEMENT FORMAT (DAF): {GROUP ACKNOWLEDGEMENT | RANDOM ACCESS ACKNOWLEDGEMENT - LONG | RANDOM ACCESS ACKNOWLEDGEMENT - SHORT | INDIVIDUAL ACKNOWLEDGEMENT }

METHOD AND SYSTEM FOR OPERATING A RADIO NETWORK CONTROLLER IN A WIRELESS COMMUNICATION SYSTEM

BACKGROUND OF THE INVENTION

Wireless communication systems generally include a plurality of communication devices, such as mobile or portable transmitting subscriber units that are located in multiple sites. Each site may include a set of base stations and/or receivers for communicating information such as voice, data, control, and network management traffic between the communication devices and with other base stations and/or receivers. The wireless communication systems may include a machine-to-machine (M2M) communication system comprising M2M communications between the transmitting subscriber units. The M2M communications refer to wireless or wired communications between transmitting subscriber units. Such transmitting subscriber units are also known as M2M communication devices. The M2M communications may be transmitted over a narrowband channel or a broadband channel. A broadband channel is a channel that supports high bit-rate transmissions and a narrowband channel is a channel that supports low bit-rate transmissions. The public safety environment more commonly utilizes narrowband channels for communication as the narrowband channels are currently more cost effective.

Narrowband channels can support sufficient throughput for M2M communications between small groups of M2M communication devices. However, narrowband channels cannot provide sufficient throughput for M2M communications between large groups of M2M communication devices distributed over a large metropolitan area as the narrowband channels can only support low bit-rate transmissions.

Accordingly, there is a need to improve the capacity of a narrowband channel for providing sufficient throughput for M2M communications between large groups of M2M communication devices or to provide more efficient use of broadband channels.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 4 shows a table illustrating an example signal quality metric (SQM) database in accordance with an embodiment of the present disclosure.

FIG. 5 shows a table illustrating an example group database in accordance with an embodiment of the present disclosure.

Figure 1:
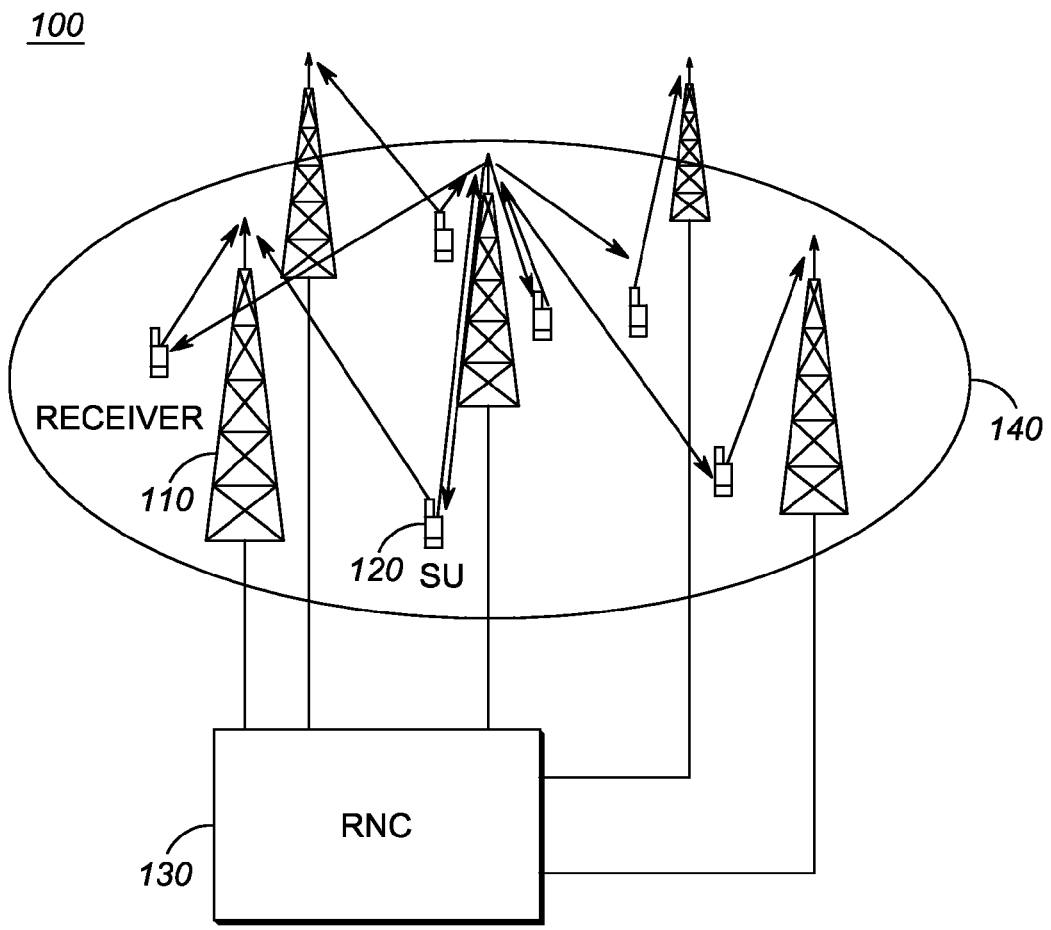
FIG. 1 is a block diagram of a wireless communication system in accordance with an embodiment of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

A method and a system for operating a radio network controller (RNC) in a wireless communication system that comprises a plurality of transmitting subscriber units communicating with a plurality of receivers is provided herein. The RNC generates a group database comprising a plurality of transmitting groups. Each transmitting group includes one or more substantially simultaneously transmitting subscriber units. The plurality of receivers is able to receive transmissions from each transmitting subscriber unit within each transmitting group. A resultant Signal to Interference plus Noise Ratio SINR) associated with the substantially simultaneous transmissions received from each transmitting subscriber unit within each transmitting group meets a pre-defined SINR threshold at at least one receiver. In response to a new transmitting subscriber unit requesting to be a member of a transmitting group, the RNC receives signal quality metrics (SQMs) associated with the new transmitting subscriber unit measured at the plurality of receivers. Further, the RNC steps through the plurality of transmitting groups in the group database. The RNC tests the received SQMs associated with the new transmitting subscriber unit with the resultant SINR associated with each transmitting group to determine if the new transmitting subscriber unit could be added to a transmitting group without reducing a resultant SINR associated with the transmitting group below the pre-defined SINR threshold. The RNC assigns the new transmitting subscriber unit to the transmitting group, on determining that the new transmitting subscriber unit could be added to the transmitting group without reducing the resultant SINR associated with the transmitting group below the pre-defined SINR threshold.

FIG. 1 is a block diagram illustrating a wireless communication system 100 in accordance with an embodiment of the present disclosure. The wireless communication system 100 comprises a plurality of receivers 110, a plurality of transmitting subscriber units 120, and a radio network controller (RNC) 130. In one embodiment of the present disclosure, the receivers 110 may be replaced with any other suitable network infrastructure device that can receive information in a signal from a subscriber unit 120 and/or from the RNC 130 and transmit information in signals to one or more other subscriber units and/or to the RNC 130 via one or more wired or wireless communication links. Suitable network infrastructure devices include, but are not limited to, repeaters, base transceiver stations, base stations, access points, routers, servers, or other types of infrastructure equipment interfacing a wireless communication device or a subscriber unit 120 in a wireless environment. It is to be noted that the terms "receiver" or "transmitting receiver" may be used interchangeably and both represent receivers 110. In one embodiment of the present disclosure, the subscriber unit 120 includes, but is not limited to, devices that are commonly referred to as access terminals, mobile radios, mobile stations, wireless communication devices, user equipments, mobile devices, or any other devices capable of operating in a wireless environment. Examples of subscriber unit 120 include, but are not limited to, two-way radios, mobile phones, cellular phones, personal digital assistants, laptops, and pagers. It is to be noted that the terms "subscriber" or "transmitting subscriber" may be used interchangeably and both represent subscriber units 120. In one embodiment, the RNC 130 includes, but is not limited to, devices that are commonly referred to as controller, processor, central processor, system processor, or other types of devices interfacing a wireless communication device or a subscriber unit 120 in a wireless environment.

In accordance with an embodiment of the present disclosure, the receivers 110 transmit and receive communications to and from subscriber units 120 within their coverage area. The receivers 110 of the wireless communication system 100 can transmit and receive communications to and from the subscriber units 120 within the coverage area 140 of the wireless communication system 100. Also, the receivers 110 may transmit and receive communications to and from the RNC 130. Further, it is to be understood that the wireless communication system 100 is only a logical representation of connections between a plurality of receivers 110, a plurality of transmitting subscriber units 120, and a radio network controller (RNC) 130, and thus the wireless communication system 100 may otherwise include more or less number of receivers, subscriber units, and RNCs.

In an embodiment of the present disclosure, the wireless communication system 100 is a machine to machine (M2M) communication system. The M2M communication system includes M2M communications between the transmitting subscriber units 120. Such transmitting subscriber units 120 communicating in a M2M communication system may also be called M2M communication devices. The M2M communications are transmitted over a narrowband channel or a broadband channel. For example, the public safety environment utilizes narrowband channels for communication as the implementation is cost effective. Embodiments of the present disclosure can be implemented in public safety environment that more commonly utilizes narrowband channels for M2M communications between large groups of M2M communication devices distributed over a large metropolitan area. The methods and systems described with reference to the embodiments of the present disclosure improve the throughput of such narrowband wireless communications channels employed in public safety environment. In other embodiments, broadband wireless communications channels could be used as well.

In accordance with the embodiments of the present disclosure, the system described in the present disclosure improves the capacity of the wireless communications channels by grouping the subscriber units 120 distributed over a geographical area into a number of logical groups. All the subscriber units 120 in a given logical group are able to simultaneously transmit to the receivers 110 at a particular time period which leads to capacity improvement of the wireless communications channels.

Further, when a new subscriber unit enters into the geographical area and/or requests to be a member of an arbitrary group, the system adds the new subscriber unit into an existing group or creates a new group based on the signal quality metrics (SQMs) associated with the new subscriber unit and the resultant Signal to Interference plus Noise Ratio (SINR) associated with each group. Such use of SQMs to decide the group composition ensures that all subscriber units 120 within a group are able to transmit simultaneously to the receivers 110 at a particular time period. The system employing multiple groups where each subscriber unit 120 in a particular group can transmit at the same time leads to capacity improvement of the wireless communications channels.

In one embodiment of the present disclosure, a new subscriber unit sends a discovery packet. The receivers 110 receive the discovery packet and measure the SQMs associated with the new subscriber unit. The receivers 110 forward the measured SQMs to the RNC 130. The RNC 130 adds the new subscriber unit into an existing group if the resultant SINR associated with the existing group does not fall below the predetermined SINR threshold. The RNC 130 creates a new group and assigns the new subscriber unit to the new group if the resultant SINR associated with the existing groups fall below the predetermined SINR threshold.

Figure 2:
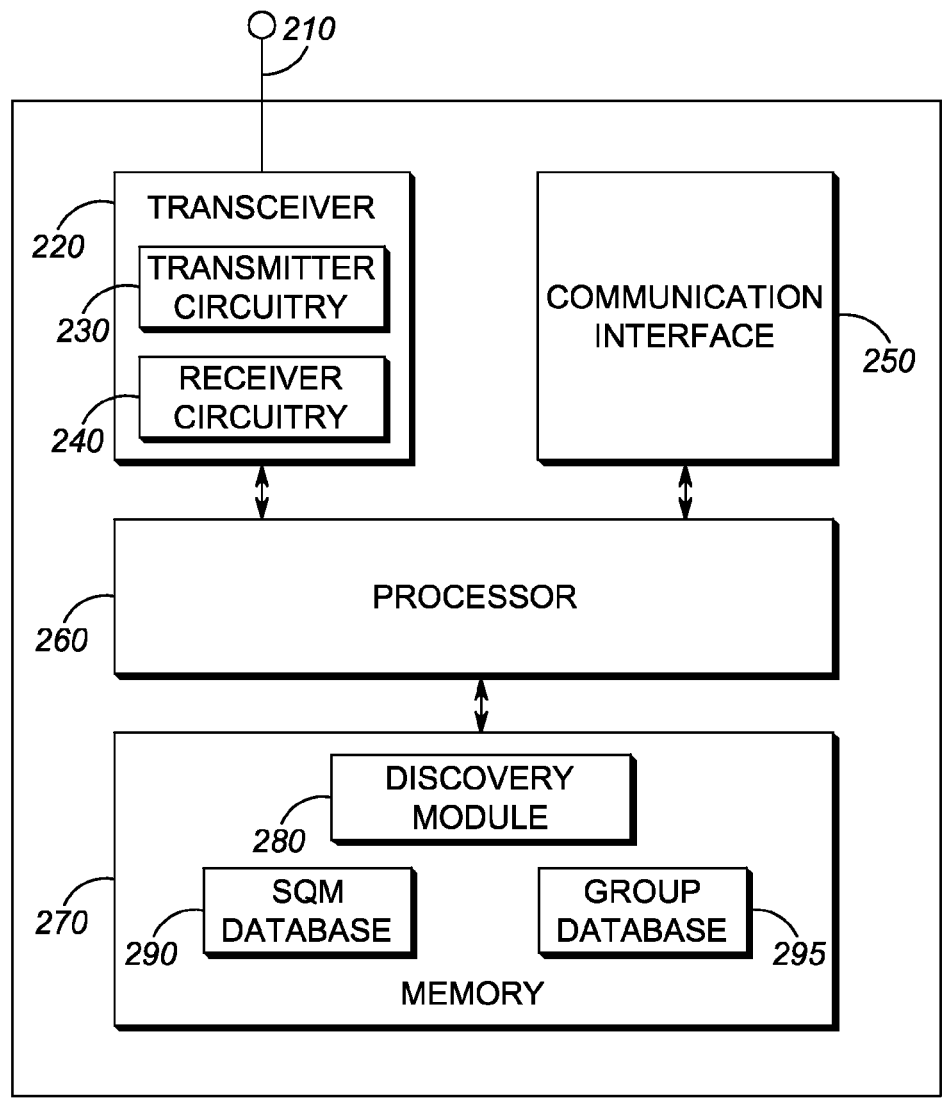
FIG. 2 is a block diagram of an example radio network controller (RNC) in accordance with an embodiment of the present disclosure.

FIG. 2 is a block diagram of an apparatus 200 for operation within the wireless communication system 100 of FIG. 1 in accordance with the embodiments of the present disclosure. The apparatus 200, for example, is implemented in the RNC 130 in the wireless communication system 100. The apparatus 200 includes a transceiver 220 including a transmitter circuitry 230 and a receiver circuitry 240, a communication interface 250, a processor 260, and a memory 270 for storing a discovery module 280, a signal quality metric (SQM) database 290, and a group database 295. The apparatus 200 is an integrated unit containing at least all the elements depicted in FIG. 2, as well as any other elements necessary for operating the apparatus 200 of FIG. 2 in the wireless communication system 100. Alternatively, the apparatus 200 can comprise a collection of appropriately interconnected units or devices, wherein such units or devices perform functions that are equivalent to the functions performed by the elements of the apparatus 200.

The transmitter circuitry 230 and the receiver circuitry 240 together form the transceiver 220 to enable bi-directional communications between RNC 130 and the receivers 110. In accordance with the embodiments of the present disclosure, the transceiver 220 may be a wireless or a wired transceiver.

In one embodiment, the RNC 130 additionally comprises an antenna 210 to facilitate wireless communication with the receivers 110. The antenna 210 comprises any known or developed structure for radiating and receiving radio frequency (RF) signals from the receivers 110 in the wireless communication system 100 over which the transmitter circuitry 230 and the receiver circuitry 240 are used to communicate.

The communication interface 250 includes appropriate hardware and software architecture in accordance with known techniques that enable the RNC 130 to communicate with other communication entities, for example, subscriber units 120 and receivers 110. The processor 260 includes one or more microprocessors, microcontrollers, DSPs (digital signal processors), state machines, logic circuitry, or any other device or devices that process information based on operational or programming instructions. Such operational or programming instructions (not shown) are stored in the memory 270. The memory 270 can be an IC (integrated circuit) memory chip containing any form of RAM (random-access memory), a floppy disk, a CD-RW (compact disk with read write), a hard disk drive, a DVD-RW (digital versatile disc with read write), a flash memory card, external subscriber identity module (SIM) card or any other medium for storing digital information. One of ordinary skill in the art will recognize that when the processor 260 has one or more of its functions performed by a state machine or logic circuitry, the memory 270 containing the corresponding operational instructions can be embedded within the state machine or logic circuitry. The memory 270 is operated to store and maintain a discovery module 280 that, when executed by processor 260, operates the RNC 130 in the wireless communication system 100 and performs one or more of the functions, steps, message transmissions, and message receptions as set forth in FIGS. 6A and 6B.

The memory 270 further stores and maintains SQM database 290 and Group database 295. The SQM database 290 comprises a list of subscriber units 120 and a list of receivers 110. The signal quality metrics (SQMs) associated with the transmitting subscriber units 120 are measured at the receivers 110. As such, for each subscriber unit 120, the signal quality metrics are measured at each receiver 110 within a transmission range of the subscriber units 120. The SQMs associated with the transmitting subscriber units 120 is a function of one or more of signal to noise plus interference ratio (SINR) associated with each transmitting subscriber unit 120, a received signal strength indicator (RSSI) associated with each transmitting subscriber unit 120, and error counts associated with the transmissions received from each transmitting subscriber unit 120.

In accordance with the embodiments of the present disclosure, the group database 295 comprises a list of transmitting groups. Each transmitting group includes one or more transmitting subscriber units 120. Each transmitting subscriber unit 120 within each transmitting group is able to communicate with at least one receiver 110 at a particular time period. In one embodiment of the present disclosure, the decision to include a new subscriber unit in an existing group or to create a new group is based on the SQMs associated with the new subscriber unit and a resultant SINR associated with each group, as calculated by the RNC 130. The RNC 130 calculates the resultant SINR caused by adding a new subscriber unit to an existing transmitting group. Therefore, the resultant SINR is a function of the SQMs associated with each transmitting subscriber unit 120 within a particular group, plus the additional interference caused by adding a new transmitting subscriber unit into the particular group. The transmitting groups are based on this resultant SINR such that the resultant SINR meets a pre-defined SINR threshold at at least one of the receivers 110. In the embodiments of the present disclosure, the RNC 130, while determining to add a new subscriber unit to an existing group, further re-calculates the resultant SINR, on adding the new subscriber unit, for each existing group. If the re-calculated resultant SINR for a particular existing group still meets the pre-defined SINR threshold at at least one receiver 110, only then the RNC 130 adds the new subscriber unit to that particular existing group. The addition of the new subscriber unit to the particular existing group is not an addition to the interference to the particular existing group. The pre-defined SINR threshold is a minimum value of the SINR that each group is required to meet at at least one receiver 110 for successful simultaneous transmissions from each member subscriber unit 120 within each group.

As illustrated in FIG. 2, the processor 260 is coupled to the transceiver 220 and the memory 270 and the processor 260 is configured to receive, via the transceiver 220, SQMs associated with a new transmitting subscriber unit measured at the receivers 110 in response to the new transmitting subscriber unit requesting to be a member of a transmitting group. The processor 260 further steps through the transmitting groups in the group database 295. The processor 260 then tests the received SQMs associated with the new transmitting subscriber unit with the resultant SINR associated with each transmitting group to determine if the new transmitting subscriber unit could be added to an existing transmitting group without reducing a resultant SINR associated with the existing transmitting group below the pre-defined SINR threshold. Further, the processor 260 assigns the new transmitting subscriber unit to an existing transmitting group on determining that the new transmitting subscriber unit could be added to the existing transmitting group without reducing the resultant SINR associated with the existing transmitting group below the pre-defined SINR threshold. On the other hand, the processor 260 assigns the new transmitting subscriber unit to a new transmitting group on determining that the addition of the new transmitting subscriber unit to the existing transmitting groups would reduce the resultant SINR associated with each existing transmitting group below the pre-defined SINR threshold.

Figure 3:
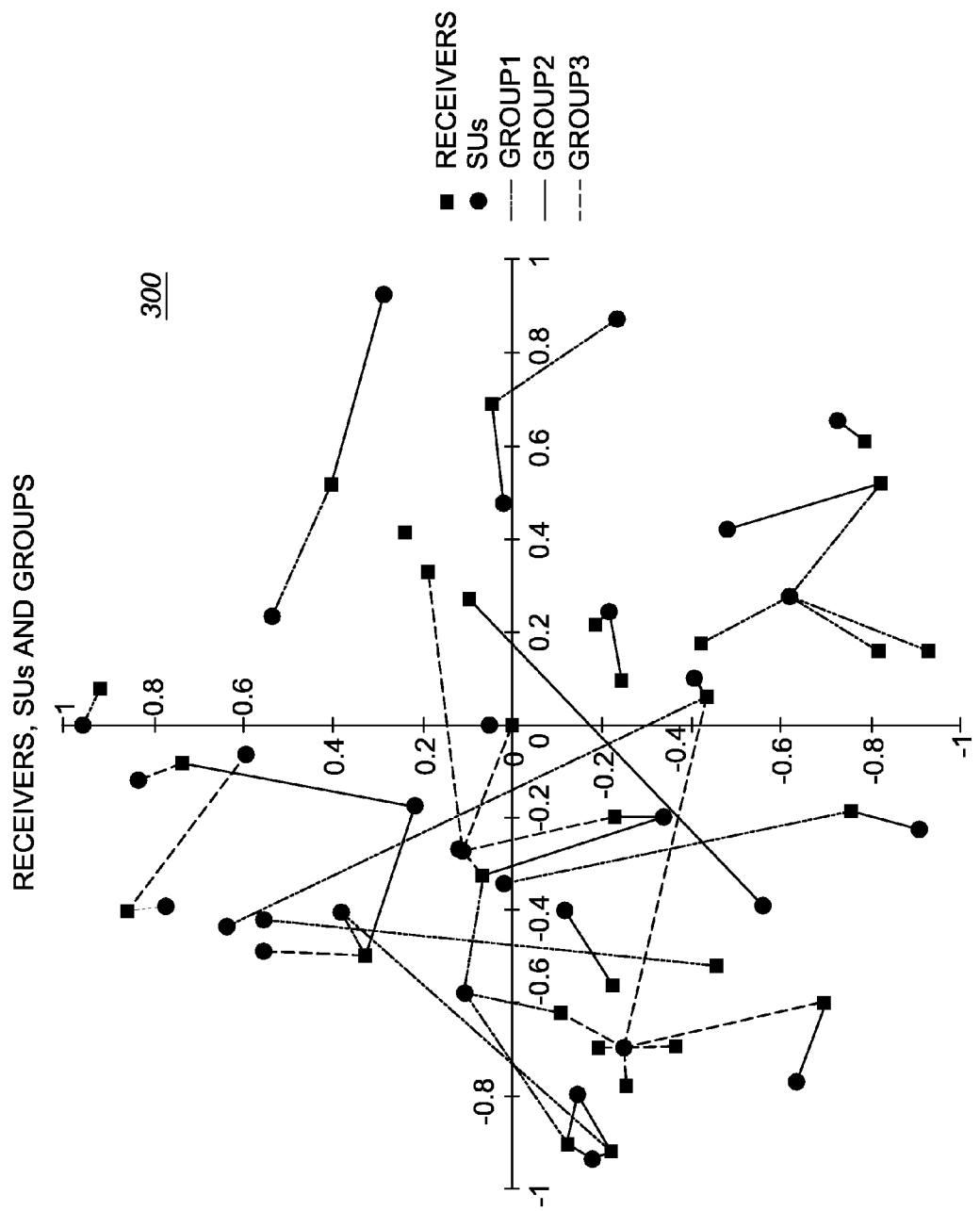
FIG. 3 is a pictorial representation of a group formation of subscriber units in a given geographical space in accordance with an embodiment of the present disclosure.

FIG. 3 is a pictorial representation of the group formation of subscriber units 120 in a given geographical space in accordance with an embodiment of the present disclosure. In FIG. 3, the receivers 110 are represented using a square legend and the subscriber units 120 are represented using a circle legend. Further, in FIG. 3, a group of a given subscriber unit 120 is identified by a line type connecting the subscriber unit 120 and a receiver 110. For example, FIG. 3 shows three groups, each indicated by three different types of lines. The subscriber units 120 are grouped into three transmitting groups, GROUP 1, GROUP 2, and GROUP 3, based on the SQMs associated with each transmitting subscriber unit 120. For example, a first subscriber unit 120 located at (0.4, −0.5) in the geographical space of FIG. 3 communicates with a receiver 110 located at (0.55, −0.8) coordinates. Similarly, a second subscriber unit 120 located at (−0.8, −0.6) in the geographical space of FIG. 3 communicates with a receiver 110 located at (−0.6, −0.7) coordinates. As shown in FIG. 3, both the first subscriber unit 120 and the second subscriber unit 120 are geographically dispersed while being a member of a same group, GROUP 2. The grouping of subscriber units 120 into groups based on the SQMs associated with the subscriber units 120 increases the capacity of the communication channels as all the subscriber units 120 of a particular transmitting group are capable of communicating with at least one receiver 110 at a particular time period. In other words, the plurality of receivers 110 is able to receive transmissions from each transmitting subscriber unit 120 within a particular transmitting group. Also, each receiver 110 is capable of receiving transmissions from not more than one subscriber unit 120 associated with a particular group at a particular time period in order to avoid collisions. In one example, when there are three transmitting groups and 5 or more receivers 110, at least five of the receivers 110 are able to successfully receive transmissions from 3 simultaneously transmitting subscriber units 120 associated with three different transmitting groups during any moment in time. During other time intervals other transmitting groups will be able to have their simultaneous transmissions. According to the embodiments of the present disclosure, the capacity of the system is increased by intelligently dividing the subscriber units 120 into transmitting groups such that each subscriber unit 120 within each transmitting group can transmit substantially simultaneously at any given time period. The number of receivers 110, subscriber units 120, and transmitting groups shown in FIG. 3 is merely for representation purposes and the scope of the present disclosure is not limited to the number of receivers 110, subscriber units 120, and transmitting groups shown in the figure and there may be more or less number of receivers 110, subscriber units 120, and transmitting groups in various embodiments of the present disclosure.

FIG. 4 shows a table 400 illustrating an example of SQM database 290 in accordance with an embodiment of the present disclosure. The table 400 includes a subscriber unit field 410, a receiver field 420, and a SQM field 430 comprising a list of SQM values. The subscriber unit field 410 includes a list of subscriber units 120 for which SQM values have been measured at the receivers 110. The receiver field 420 includes a list of receivers 110 that have measured the SQMs associated with the subscriber units 120. Each row in the table 400 corresponds to a subscriber unit 120 for which each receiver 110 have measured the SQMs. For each subscriber unit 120, a row is created in the table 400 where the SQM field 430 will have SQM values associated with each subscriber unit 120 measured at each receiver 110.

The SQMs associated with the transmissions received from each subscriber unit 120 are measured at the receivers 110. The measured SQMs are stored in the SQM database 290 maintained at the RNC 130. For example, in the second row, in FIG. 4, the SQMs associated with the first subscriber unit (SU1) measured at five receivers (R1, R2, R3, R4, and R5) are stored in the SQM database 290. Similarly, the SQMs are measured for the other subscriber units (SU2, SU3, SU4, SU5, and SU6) based on the transmissions received at the receivers 110. The measured SQMs associated with the subscriber units 120 are stored into the SQM database 290. In one embodiment of the present disclosure, the RNC 130 receives the SQMs associated with a new subscriber unit and adds the received SQMs associated with the new subscriber unit into the SQM database 290. The SQM of a subscriber unit 120 at a receiver 110 that is out of range of the subscriber unit 120 would be a number beyond the threshold value for the transmissions to be received by the receiver 110. In this case, for example, the SNR threshold value is set to zero and if bit error rate (BER) is used, threshold value is set to above 5%. Further, when a subscriber unit 120 moves out of the range of a receiver 110 that receives the transmissions from the subscriber unit 120, the subscriber unit 120 is re-assigned to a new group. In one embodiment, when the subscriber unit 120 moves out of the range of a receiver 110 that receives the transmissions from the subscriber unit 120 and moves into the range of another receiver that is not being used by its current group members, then the subscriber unit 120 is continued to be assigned to the same group but its transmissions would be received by the other receiver. However, the scope of the present disclosure is not limited to five receivers and six subscriber units and there may be more or less number of receivers and subscriber units in various embodiments of the present disclosure.

FIG. 5 shows a table 500 illustrating an example group database 295 in accordance with an embodiment of the present disclosure. The group database 295 is based on the SQM database 290. The group database 295 comprises a group field 510 and a subscriber unit field 520. The group field 510 includes a list of groups. The subscriber unit field 520 comprises the identifiers of the subscriber units 120 which are members of each group. Each transmitting group comprises at least one transmitting subscriber unit 120. The terms "groups" and "transmitting groups" may be used interchangeably and both the terms refer to the groups as described in various embodiments of the present disclosure. In accordance with the embodiments of the present disclosure, the transmitting groups or the groups described in the disclosure are polling groups. Polling groups are defined for stationary subscriber units that report on a non-real time basis which, through a discovery packet, form polling groups such that the group members of a particular polling group can substantially simultaneously transmit. A random access mode is also provided for subscriber units that are mobile or transmit based on external triggers, to handle retries for failed polled transmissions (transmissions from a subscriber unit that is a member of a polling group) and to facilitate a discovery process (or a group discovery process). The discovery process or the group discovery process is a process associated with the new transmitting subscriber unit transmitting a discovery packet to join any arbitrary polling group. The subscriber units may be provisioned to use random access or polling access modes or to automatically decide which to use. Polling access mode may be preferred for fixed subscriber units while random access mode may be preferred for moving subscriber units. Subscriber units that are members of polling groups may still use random access mode to report at off-polling times and to retry failed polled transmissions. In the automatic mode, a subscriber unit joins a polling group but may determine from repeated negative acknowledgements of its polled transmissions that it has moved. Such a subscriber unit may transmit using the random access mode.

The decision to include a new subscriber unit in an existing group or creating a new group is based on the SQMs associated with the new subscriber unit and the resultant SNR associated with each group. The SQMs associated with the new subscriber unit is one by one added to each existing group to check the resultant SINR associated with each existing group. The new subscriber unit is added to an existing group if the resultant SINR associated with the existing group does not fall below a predetermined SINR threshold. This predetermined SINR threshold represents a minimum value of the SINR associated with the transmissions from the group members in each group. Various permutations and combinations for adding the new subscriber unit to an existing group are tried such that the SINR associated with the existing group is not below the predetermined minimum SINR threshold. For example, FIG. 5 shows three groups, $G_1$, $G_2$, and $G_3$. The first group $G_1$ comprises the subscriber units, SU1, SU2, and SU6 such that the resultant SINR associated with the substantially simultaneous transmissions received from SU1, SU2, and SU6 at the receivers 110 is not below a pre-determined minimum SINR threshold. The second group $G_2$ comprises the subscriber units, SU3 and SU5 such that the resultant SINR associated with the substantially simultaneous transmissions received from SU3 and SU5 at the receivers 110 is not below a pre-determined minimum SINR threshold. The third group $G_3$ comprises subscriber unit, SU4 such that the SINR associated with the transmissions received from SU4 at the receivers 110 is not below a pre-determined minimum SINR threshold.

Figure 6A:
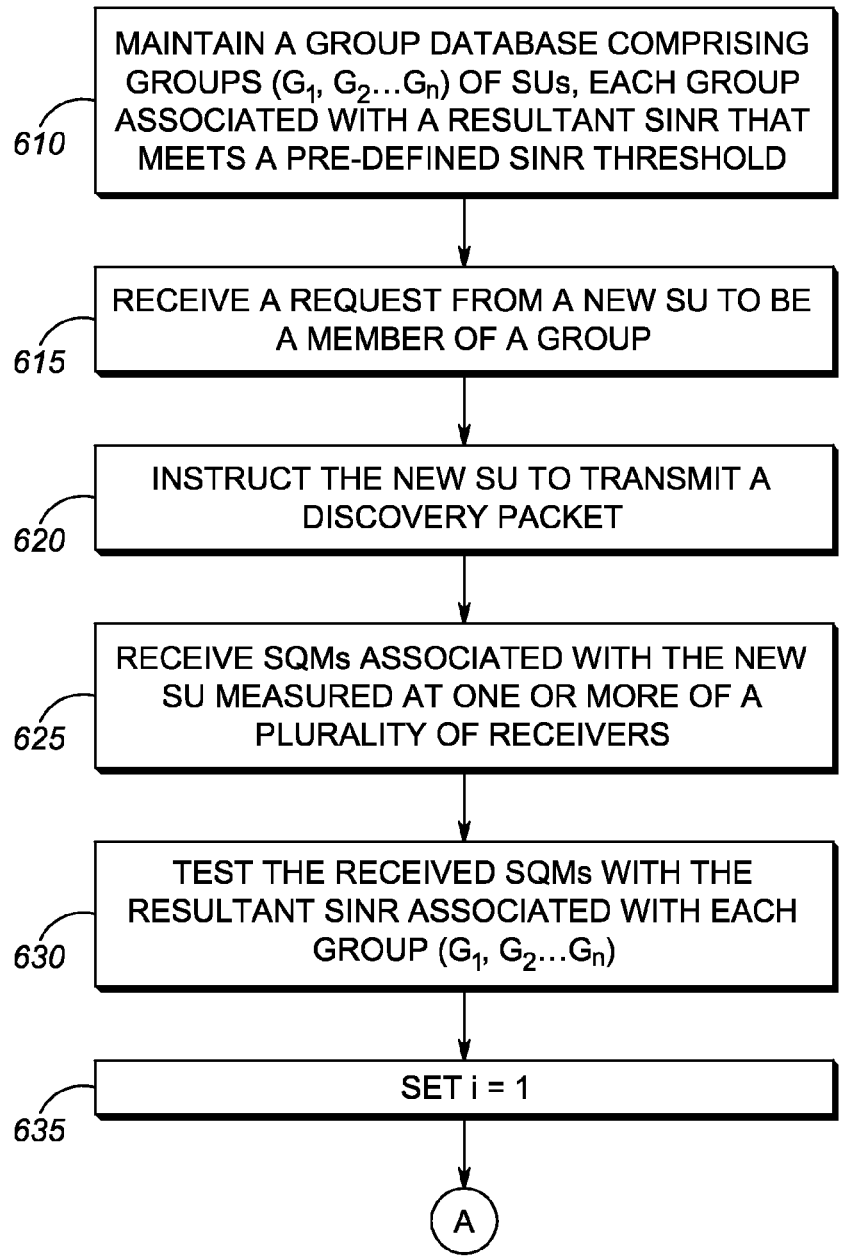
FIGS. 6A and 6B include a flowchart illustrating an example operation in the wireless communication system of FIG. 1 for increasing a capacity of a communication channel in accordance with an embodiment of the present disclosure.
Figure 6B:
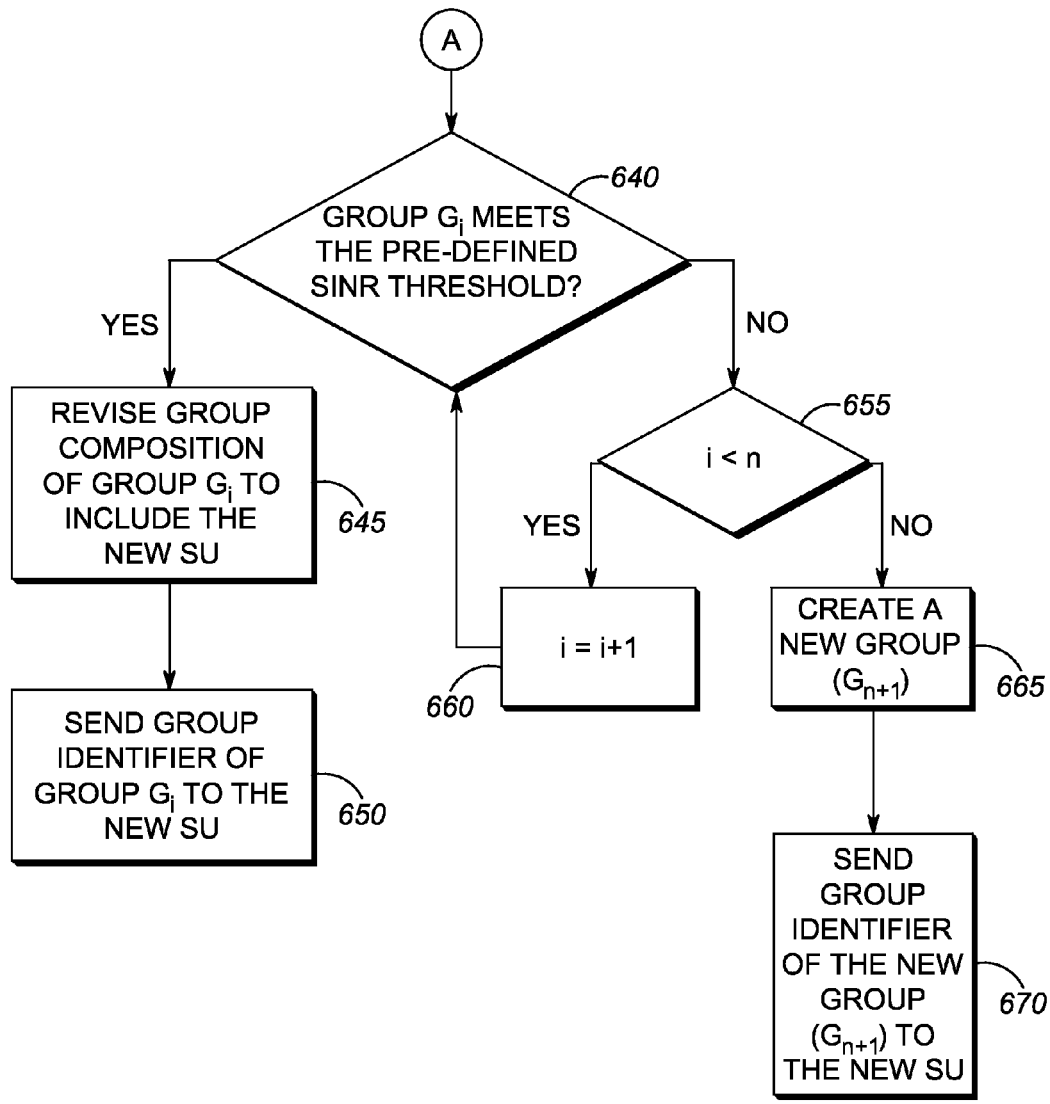

FIGS. 6A and 6B include a flowchart illustrating a method 600 of operation by an apparatus, such as the apparatus 200, that may be implemented, for example, in a radio network controller (RNC) such as the RNC 130 and used for operating the RNC 130 in the wireless communication system 100 to increase the capacity of a communication channel in accordance with an embodiment of the present disclosure. In accordance with the embodiments of the present disclosure, the RNC 130 maintains a SQM database 290 in accordance with the SQM database 290 described in FIG. 4. The RNC 130, at step 610, maintains a group database 295 comprising groups $(G_1, G_2 \ldots G_n)$ of subscriber units 120. Herein, the variable $G_n$ represents the last group and the variable n represents the number of groups. Each group in the group database 295 is associated with a resultant SINR wherein the resultant SINR is calculated on the basis of the SQMs stored and associated with the respective group members in each group. As such, the resultant SINR associated with the transmissions received from each subscriber unit 120 within each group meets a pre-determined SINR threshold. At step 615, the RNC 130 receives a request from a new subscriber unit to be a part of any arbitrary polling group in the wireless communication system 100. The new subscriber unit sends the request to be a part of any arbitrary polling group in a request message upon its activation.

At step 620, the new subscriber unit receives a control or data packet from the RNC 130. The received packet contains an instruction for the new subscriber unit to transmit a discovery packet on an inbound channel at a particular time period. The inbound channel represents a channel on which transmissions from the subscriber units 120 are received by the receivers 110. On the other hand, transmissions from the receivers 110 are received by the subscriber units 120 on an outbound channel. The inbound and the outbound channels are the channels known by the RNC 130 to be available based on subscriber unit's 120 current location and the receiver's 110 association with the subscriber unit 120. Other subscriber units 120 in the wireless communication system 100 are not allowed to transmit when the new subscriber unit transmits the discovery packet so that the SQMs associated with the new subscriber unit can be measured accurately with minimum interference at the receivers 110. Next, the new subscriber unit transmits a discovery packet which is received by the receivers 110. Each receiver 110 that has received the discovery packet measures the SQMs associated with the new subscriber unit from the received discovery packet. In one embodiment of the present disclosure, the discovery packet includes information about subscriber unit's 120 geographic location, any alternate wireless capabilities, subscriber unit's 120 sensor information, and other unique subscriber unit's 120 parameters. The receivers 110 forward the measured SQMs associated with the new subscriber unit to the RNC 130. The measured SQMs associated with the new subscriber unit, in step 625, are then received by the RNC 130 from the receivers 110. As such, the RNC 130 receives and loads the SQMs associated with the new subscriber unit into the SQM database 290 maintained at the RNC 130.

At step 630, the RNC 130 tests the received SQMs associated with the new subscriber unit with the resultant SINR associated with each group in the group database 295. In particular, the RNC 130 steps through the group database 295 by going group by group to get an estimate of the SINR that will result at each existing group should the new subscriber unit be added to an existing group. For stepping group by group through the group database 295, at step 635, set a variable i=1, where the variable i represents a group number and can take any value between 1, 2, 3 . . . n depending on the number of groups ("n") in the group database 295. In FIG. 6B, at step 640, it is determined whether the new subscriber unit could be added to group $G_1$ without reducing a resultant SINR associated with group $G_1$ below the pre-determined SINR threshold. For example, the pre-determined SINR threshold could be a range or series of narrowing ranges between 6 to 18 dB or between 6 to 20 dB. At step 645, the group composition of group $G_1$ is revised to include the new subscriber unit and the new subscriber unit is assigned to group $G_1$ on the determination that the new subscriber unit could be added to the group $G_1$ without reducing the resultant SINR associated with group $G_1$ below the pre-determined SINR threshold. At step 650, a unique group identifier associated with group $G_1$ is assigned and then sent to the new subscriber unit. The unique group identifier is common to each member subscriber unit 120 within each transmitting group. As such, a unique group identifier is assigned to each transmitting group. After assigning the unique group identifier to the new subscriber unit, the new subscriber unit becomes a member of the existing group, $G_1$ and transmits simultaneously with all other members of the existing group $G_1$ according to a group transmit schedule provided by the RNC 130.

Returning to step 640, if it is determined that the addition of the new subscriber unit to group $G_1$ reduces the resultant SINR associated with group $G_1$ below the pre-defined SINR threshold, at step 655, it is checked whether the value of the variable i is less than n, where n is the number of groups in the group database 295. When the variable i is less than the number of groups, n, in the group database 295, the RNC 130 proceeds to step 660 and steps through the next group in the group database 295. At step 660, the value of the variable i is incremented to i+1, such that the RNC 130, in the present embodiment, moves to group $G_2$. Step 640 is then repeated and steps 645 and 650 are repeated on determining that the new subscriber unit could be added to group $G_2$ without reducing a resultant SINR associated with group $G_2$ below the pre-determined SINR threshold. Thus the new subscriber unit becomes a member of the existing group, $G_2$.

If, returning to step 640, it is determined that the new subscriber unit could not be added to group $G_2$ without reducing a resultant SINR associated with group $G_2$ below the pre-determined SINR threshold, the steps 640, 645, and 650 are repeated for all the remaining groups up to group $G_n$ until it is determined that the new subscriber unit could be added to an existing group without reducing a resultant SINR associated with the existing group below the pre-determined SINR threshold.

On the other hand, at step 655, when it is determined that the variable i is not less than n, which means that there is no more existing group for the RNC 130 to step through in the group database 295. In this case, at step 665, a new group $G_{n+1}$ is created to include the new subscriber unit in the newly created group $G_{n+1}$ as there is no existing group to which the new subscriber unit could be added without reducing the resultant SINR associated with the existing groups below the pre-defined SINR threshold. At step 670, a unique group identifier for the new group $G_{n+1}$ is created and assigned to the new subscriber unit. The unique group identifier for the new group is then sent to the new subscriber unit, and the new subscriber unit transmits simultaneously with all other members of the new group (if any) according to a group transmit schedule provided by the RNC 130.

On becoming a member of an existing group or on creating a new group, the new subscriber unit is able to communicate in the wireless communication system 100. In one embodiment of the present disclosure, the transmitting subscriber units 120 receive acknowledgements for their transmissions.

In accordance with the embodiments of the present disclosure, the receivers 110 and/or the RNC 130 uses acknowledgment position identifiers to provide acknowledgements for the transmissions received from each group in a single acknowledgment packet. The receivers 110 and/or the RNC 130 send a single acknowledgment packet on an outbound channel. The single acknowledgement packet includes acknowledgments for the transmissions received from each transmitting subscriber unit 120 within a transmitting group. The single acknowledgment packet further comprises a unique group identifier corresponding to the transmitting group and acknowledgment position identifiers. The acknowledgment position identifiers indicate a position in the single acknowledgement packet that is expected to contain an acknowledgment to transmissions from each transmitting subscriber unit 120 within the transmitting group.

The use of acknowledgment position identifiers in accordance with the embodiments of the present disclosure eliminates the need for separate explicit acknowledgment messages that are used in existing systems for sending specific acknowledgments to each subscriber unit 120. The elimination of explicit acknowledgment messages obviates the need for a separate outbound slot for each specific acknowledgment. In one embodiment of the present disclosure, the new subscriber unit is assigned to one of the acknowledgment position identifiers. The assigned acknowledgement position identifier indicates a position in the single acknowledgement packet, associated with a particular group that is expected to contain an acknowledgement to the transmissions from the new subscriber unit. The acknowledgement position identifier assignment is also sent to the new subscriber unit along with the group identifier.

Figure 7:
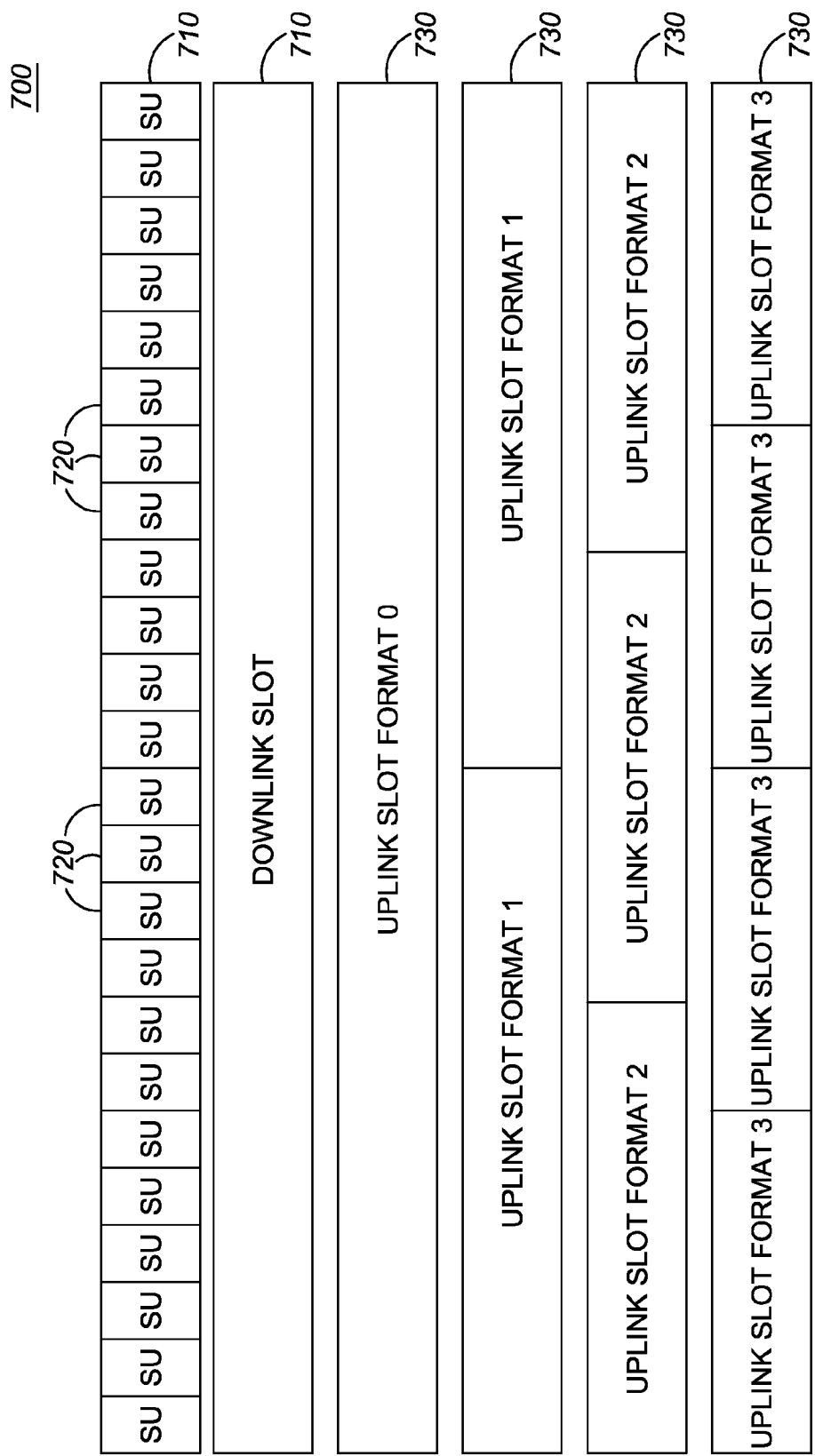
FIG. 7 shows a block diagram illustrating example downlink and uplink slot formats in accordance with an embodiment of the present disclosure.

FIG. 7 shows a block diagram 700 of example downlink slot format 710 and uplink slot format 730 in accordance with an embodiment of the present disclosure. The downlink slot format 710 includes transmissions from the receivers 110 to the subscriber units 120. On the other hand, the transmissions from the subscriber units 120 are received by the receivers 110 on the uplink slot format 730. The basic downlink slot format 710 is a concatenation of 24 micro-slots 720 and is 180 ms in duration. The micro-slots 720 are the most basic part of the downlink slot format 710.

The uplink slot format 730 is of the same size as the downlink slot format 710, but the uplink slot format 730 can be divided into up to four micro-slots using a two-bit identifier in the downlink slot header. There are four uplink slot formats 730, as indicated in FIG. 7, uplink slot format 0, uplink slot format 1, uplink slot format 2, and uplink slot format 3. The first uplink slot format 730, uplink slot format 0, is not divided into micro-slots and can be used for transmitting large messages from a subscriber unit 120. The second uplink slot format 730, uplink slot format 1, is divided into 2 micro-slots and is used for transmitting two small messages from the subscriber units 120. The third uplink slot format 730, uplink slot format 2, is divided into three micro-slots and is used for transmitting three small messages from the subscriber units 120. The fourth and the last uplink slot format 730, uplink slot format 3, is divided into four micro-slots and is used for transmitting four smaller messages from the subscriber units 120. In the embodiments of the present disclosure, the uplink slot format 730 is also referred as an inbound slot format and a downlink slot format 710 is also referred as an outbound slot format.

Figure 8:
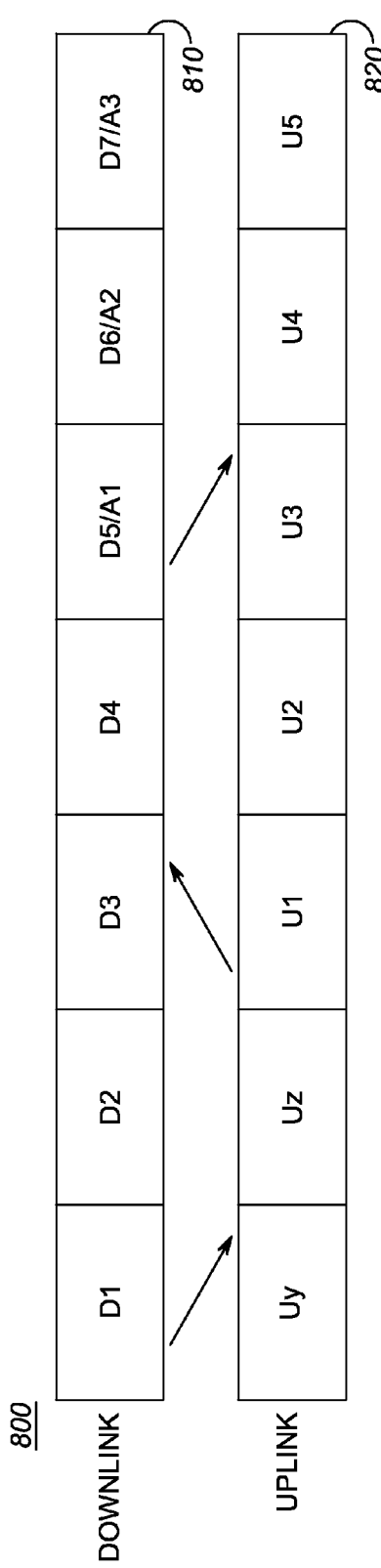
FIG. 8 shows a block diagram illustrating an example operation between a downlink and an uplink slot in accordance with an embodiment of the present disclosure.

FIG. 8 shows a block diagram 800 illustrating an example operation between a downlink slot 810 and an uplink slot 820 in accordance with an embodiment of the present disclosure. The outbound or downlink slot 810 and the inbound or the uplink slot 820 is aligned as shown in the FIG. 8. The micro-slot D1 in the downlink slot 810 contains information or instruction about the micro-slot U1 of the uplink slot 820. The contained information or instruction includes the access type and the uplink slot format 730 of the uplink micro-slot U1. The access type of the uplink micro-slot U1 may be polling access type or random access type. The polling and the random access is described previously and therefore, the complete description is omitted here for brevity. When subscriber units 120 within a particular transmitting group need to transmit, the subscriber units 120 may use the information or the instruction contained in the downlink micro-slot D1 to determine when to simultaneously transmit on the uplink micro-slot U1. The subscriber units 120 simultaneously transmit on the uplink micro-slot U1 in accordance with the information or the instruction contained in the downlink micro-slot D1. The acknowledgment A1 to the transmissions received on the uplink micro-slot U1 are sent in the downlink micro-slot D5. In this way, a particular subscriber unit 120 listens to the downlink micro-slot D1, may transmit on the uplink micro-slot U1, in response to the downlink information in the downlink micro-slot D1, and then receives its acknowledgement A1 on the downlink micro-slot D5 if the subscriber unit 120 has transmitted on the uplink micro-slot U1. Similarly, other downlink micro-slots D6 and D7 may contain the acknowledgements A2 and A3 to the transmissions received on other uplink micro-slots. The downlink slots contain the acknowledgements to the received transmissions in addition to transmitting the uplink information on the respective downlink slots.

Figure 9:
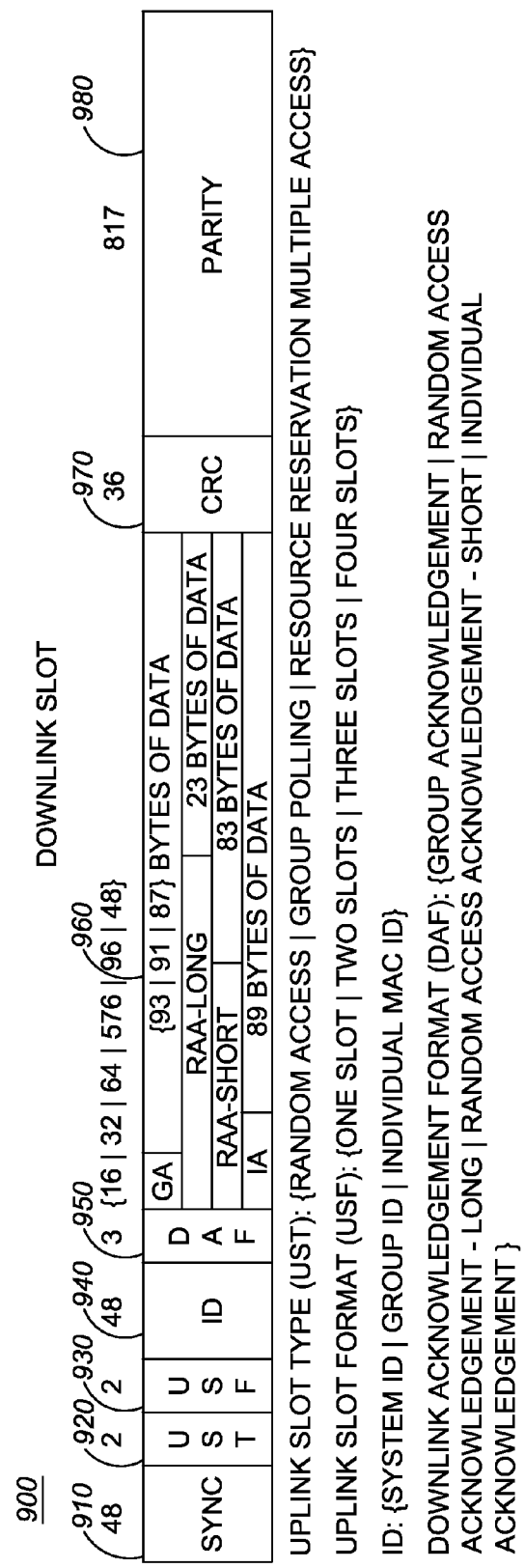
FIG. 9 shows a block diagram illustrating an example downlink slot structure in accordance with an embodiment of the present disclosure.

FIG. 9 shows a block diagram illustrating an example downlink slot structure 900 in accordance with an embodiment of the present disclosure. The structure of the downlink slot 810 is shown in FIG. 9. The downlink slot structure 900 is 180 ms long. There are 24 status symbols, which use 48 bits. The frame synchronization sequence (sync) 910 is 48 bits. The status symbols and sync 910 are physical layer entities and are not part of the media access control layer and are not protected by forward error correction (FEC). The Uplink Slot Type (UST) 920, Uplink Slot Format (USF) 930, Identifier (ID) 940, Downlink Acknowledgement Format (DAF) 950, the acknowledgement and data field formats 960, and the cyclic redundancy check (CRC) 970 are protected by a rate one-half trellis code with 817 bits of parity 980. The UST 920 field indicates what type of access shall be used on the associated uplink slot 820, either random access, polling or reserved access (when a channel is reserved for a particular subscriber unit). For example, the UST 920 value in downlink micro-slot D1 of FIG. 8 indicates the type of access that shall be used in uplink micro-slot U1 of FIG. 8. The USF 930 field indicates the number of micro-slots in the associated uplink slot. The values can be one to four sub-slots although only the single slot format can be used with reserved access. The ID 940 field is tied to UST 920 value. If UST 920 is random access, the ID 940 is the system ID; if UST 920 is group polling, the ID 940 is the polling group ID; if the UST 920 is resource reservation multiple access, the ID 940 is the media access control (MAC) address of the subscriber unit for whom the uplink resources are reserved. The DAF 950 field indicates the format of the downlink acknowledgements to the uplink transmissions. Seven acknowledgement and data field formats 960 are available with four being associated with polling groups. The four acknowledgement and data field formats 960 are shown in the FIG. 9. The four acknowledgement and data field formats 960 include GA (group acknowledgement) and 93/91/87 bytes of data as the first acknowledgement and data field format 960. The second acknowledgement and data field format 960 is random access acknowledgement—long and 23 bytes of data. The third acknowledgement and data field format 960 is random access acknowledgement—short and 83 bytes of data. The fourth acknowledgement and data field format 960 is individual acknowledgement and 89 bytes of data.

Figure 10:
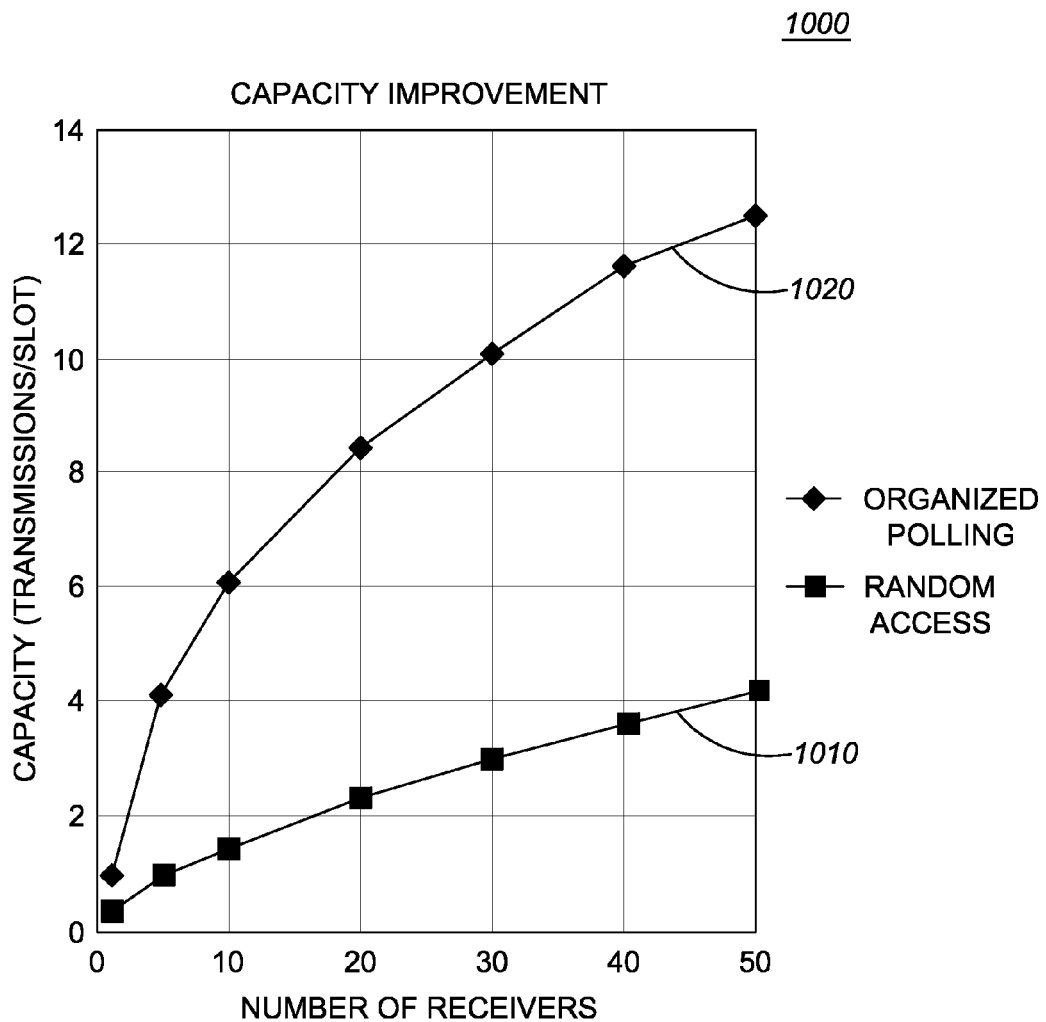
FIG. 10 shows a graph illustrating capacity improvement of a communication channel in accordance with an embodiment of the present disclosure.

FIG. 10 shows a graph 1000 illustrating capacity improvement of a communication channel in accordance with an embodiment of the present disclosure. The term capacity herein refers to the average number of transmissions per slot at a particular time period. The capacity of the existing systems with a single receiver is one transmission per slot in a particular time. In accordance with the present disclosure, by using thirty receivers, the capacity of the polling system is about ten times (10×) that of a system with a single receiver. The capacity 1010 of a slotted random access channel is about 0.36 transmissions-per-slot and the graph shows a capacity 1020 of three transmissions-per-slot, which is about eight times (8.3×) that of a single receiver.

Figure 11:
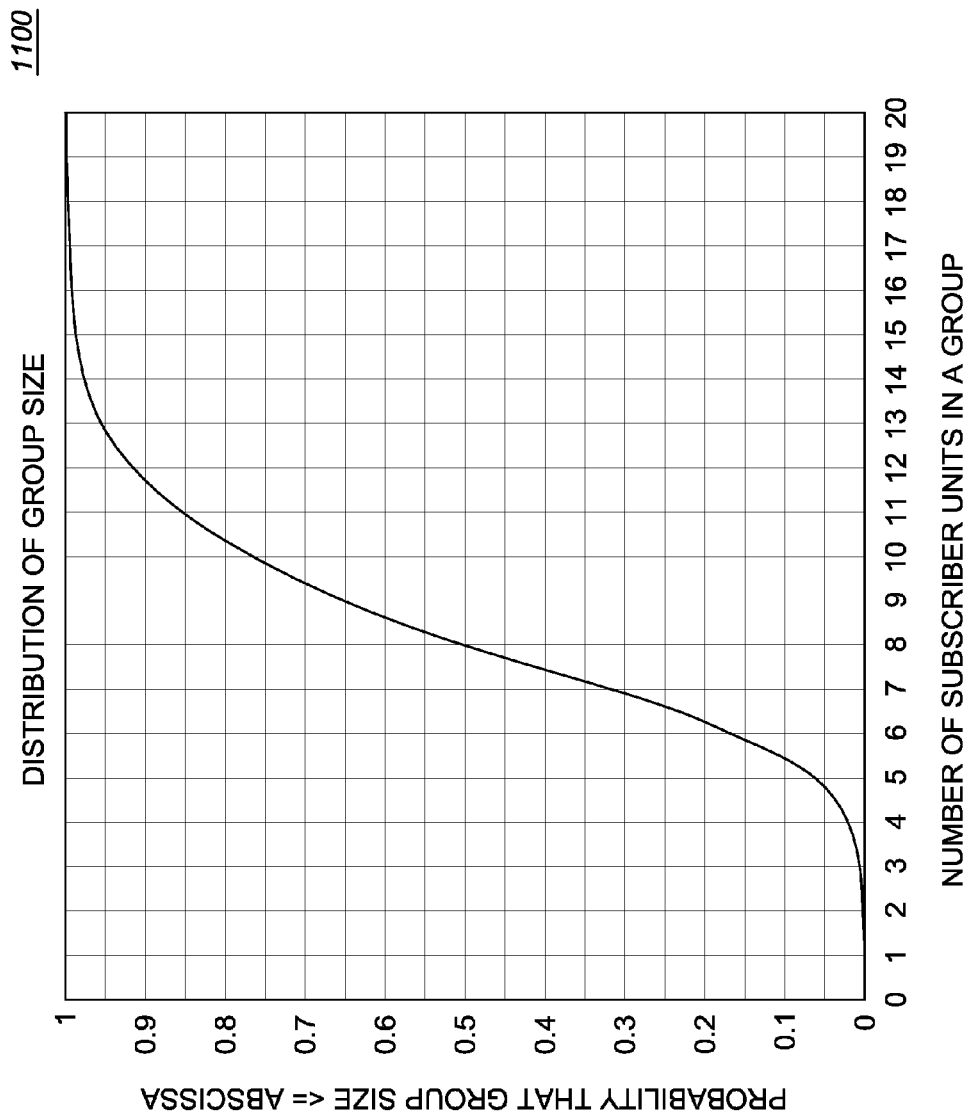
FIG. 11 shows a graph illustrating distribution of group size in accordance with an embodiment of the present disclosure.

FIG. 11 shows a graph 1100 illustrating distribution of group size in accordance with an embodiment of the present disclosure. The graph in FIG. 11 shows that the size of the polling groups is fixed at 16 subscriber units per polling group. Modeling has shown that approximately thirty receivers are required for a ten times (10×) capacity improvement and that with thirty receivers, 99% of the groups will have less than or equal to 16 group members, as is shown in FIG. 11.

The embodiments of the present disclosure described above can be advantageously implemented in public safety communication systems to improve the capacity of communications on a narrowband channel. The capacity of narrowband communication channels is improved by grouping the subscriber units 120 into a number of groups. The decision to add a new subscriber unit to an existing group or creating a new group is based on the SQMs associated with the new subscriber unit and the resultant SNR associated with each group. In addition, the capacity of the narrowband channel is also improved by eliminating the need for explicit acknowledgment messages for sending specific acknowledgments to each subscriber unit 120 and thus sending a single acknowledgement packet that includes acknowledgments for the transmissions received from each transmitting subscriber unit 120 within a transmitting group.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises", "comprising", "has", "having", "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of operating a radio network controller (RNC) in a wireless communication system that comprises a plurality of transmitting subscriber units communicating with a plurality of receivers, the method comprising:
generating, by the RNC, a group database comprising a plurality of transmitting groups, each transmitting group including one or more simultaneously transmitting subscriber units from the plurality of transmitting subscriber units, wherein the plurality of receivers are able to receive transmissions from each of the one or more transmitting subscriber units within each transmitting group such that a resultant Signal to Interference plus Noise Ratio (SINR) associated with the simultaneous transmissions received from each of the one or more transmitting subscriber units within each transmitting group meets a pre-defined SINR threshold at at least one of the plurality of receivers;
in response to a new transmitting subscriber unit requesting to be a member of a transmitting group, receiving, by the RNC, signal quality metrics (SQMs) associated with the new transmitting subscriber unit measured at one or more of the plurality of receivers;
stepping, by the RNC, through the plurality of transmitting groups in the group database and testing, by the RNC, the received SQMs associated with the new transmitting subscriber unit with the resultant SINR associated with each of the plurality of transmitting groups to determine if the new transmitting subscriber unit could be added to at least one of the plurality of transmitting groups without reducing a resultant SINR associated with the at least one of the plurality of transmitting groups below the pre-defined SINR threshold; and
assigning, by the RNC, the new transmitting subscriber unit to the at least one of the plurality of transmitting groups, on determining that the new transmitting subscriber unit could be added to the at least one of the plurality of transmitting groups without reducing the resultant SINR associated with the at least one of the plurality of transmitting groups below the pre-defined SINR threshold.

2. The method of claim 1, further comprising:
assigning the new transmitting subscriber unit to a new group, on determining that the addition of the new transmitting subscriber unit to each one of the plurality of transmitting groups reduces the resultant SINR associated with each one of the plurality of transmitting groups below the pre-defined SINR threshold.

3. The method of claim 1, further comprising:
maintaining a SQM database comprising SQMs associated with each of the plurality of transmitting subscriber units measured at one or more of the plurality of receivers; and
adding the received SQMs associated with the new transmitting subscriber unit measured at the one or more of the plurality of receivers into the SQM database.

4. The method of claim 3, wherein the resultant SINR associated with each transmitting group is a function of the SQMs associated with each of the one or more transmitting subscriber units within each transmitting group.

5. The method of claim 1, further comprising:
assigning a unique group identifier to each transmitting group, wherein the unique group identifier is common to each of the one or more transmitting subscriber units within each transmitting group.

6. The method of claim 5, further comprising:
sending a single acknowledgment packet on an outbound channel that includes acknowledgments for the transmissions received from each of the one or more transmitting subscriber units within a transmitting group, the acknowledgment packet further comprising a unique group identifier corresponding to the transmitting group and an acknowledgment position identifier.

7. The method of claim 6, wherein the acknowledgment position identifier indicates a position in the single acknowledgement packet that is expected to contain an acknowledgment to transmissions from each of the one or more transmitting subscriber units within the transmitting group.

8. The method of claim 5, wherein assigning the new transmitting subscriber unit to the at least one of the plurality of transmitting groups comprises:
assigning, to the new transmitting subscriber unit, a unique group identifier assigned to the at least one of the plurality of transmitting groups;
assigning, to the new transmitting subscriber unit, an acknowledgment position identifier indicating a position that is expected to contain an acknowledgment to transmissions from the new transmitting subscriber unit; and
sending the unique group identifier and the acknowledgment position identifier to the new transmitting subscriber unit.

9. The method of claim 1, wherein in response to the new transmitting subscriber unit requesting to be a member of a transmitting group, the method further comprising:
instructing the new transmitting subscriber unit to transmit a discovery packet on an inbound channel at a time period during which the plurality of transmitting subscriber units are not allowed to transmit; and
receiving the SQMs associated with the new transmitting subscriber unit, wherein the SQMs are measured at one or more of the plurality of receivers for the discovery packet received on the inbound channel.

10. The method of claim 1, wherein the SQMs associated with each of the plurality of transmitting subscriber units is a function of one or more of a SINR associated with each of the plurality of transmitting subscriber units, a received signal strength indicator (RSSI) associated with each of the plurality of transmitting subscriber units, and error counts associated with the transmissions received from each of the plurality of transmitting subscriber units.

11. The method of claim 1, further comprising:
sending an instruction to a transmitting group on a downlink slot, the instruction identifying an uplink slot, wherein the one or more transmitting subscriber units within the transmitting group perform transmission on the uplink slot in accordance with the instruction.

12. A radio network controller (RNC) for operating in a wireless communication system that comprises a plurality of transmitting subscriber units communicating with a plurality of receivers, the RNC comprising:
a wireline transceiver operated to communicate with the plurality of receivers;
a memory operated to maintain a group database comprising a plurality of transmitting groups, each transmitting group including one or more simultaneously transmitting subscriber units from the plurality of transmitting subscriber units, wherein the plurality of receivers are able to receive transmissions from each of the one or more transmitting subscriber units within each transmitting group such that a resultant Signal to Interference plus Noise Ratio SINR) associated with the simultaneous transmissions received from each of the one or more transmitting subscriber units within each transmitting group meets a pre-defined SINR threshold at at least one of the plurality of receivers; and a processor coupled to the wireline transceiver and the memory, the processor configured to:

receive, via the wireline transceiver, signal quality metrics (SQMs) associated with a new transmitting subscriber unit measured at one or more of the plurality of receivers in response to the new transmitting subscriber unit requesting to be a member of a transmitting group;

step through the plurality of transmitting groups in the group database and test the received SQMs associated with the new transmitting subscriber unit with the resultant SINR associated with each of the plurality of transmitting groups to determine if the new transmitting subscriber unit could be added to at least one of the plurality of transmitting groups without reducing a resultant SINR associated with the at least one of the plurality of transmitting groups below the pre-defined SINR threshold;

assign the new transmitting subscriber unit to the at least one of the plurality of transmitting groups, on the determination that the new transmitting subscriber unit could be added to the at least one of the plurality of transmitting groups without reducing the resultant SINR associated with the at least one of the plurality of transmitting groups below the pre-defined SINR threshold.

13. The RNC of claim 12, wherein the processor is further configured to assign the new transmitting subscriber unit to a new group, on the determination that the addition of the new transmitting subscriber unit to each one of the plurality of transmitting groups reduces the resultant SINR associated with each one of the plurality of transmitting groups below the pre-defined SINR threshold.

14. The RNC of claim 12, wherein the resultant SINR associated with each transmitting group is a function of the SQMs associated with each of the one or more transmitting subscriber units within each transmitting group.

15. The RNC of claim 12, wherein the processor is further configured to, in response to assigning the new transmitting subscriber unit to the at least one of the plurality of transmitting groups:

assign, to the new transmitting subscriber unit, a unique group identifier assigned to the at least one of the plurality of transmitting groups;

assign, to the new transmitting subscriber unit, an acknowledgment position identifier indicating a position that is expected to contain an acknowledgment to transmissions from the new transmitting subscriber unit; and send the unique group identifier and the acknowledgment position identifier to the new transmitting subscriber unit.

16. The RNC of claim 12, wherein the processor is further configured to, in response to the new transmitting subscriber unit requesting to be a member of a transmitting group:

instruct the new transmitting subscriber unit to transmit a discovery packet on an inbound channel at a time period during which the plurality of transmitting subscriber units are not allowed to transmit; and receive the SQMs associated with the new transmitting subscriber unit, wherein the SQMs are measured at one or more of the plurality of receivers for the discovery packet received on the inbound channel.

17. The RNC of claim 12, wherein the SQMs associated with each of the plurality of transmitting subscriber units is a function of one or more of a SINR associated with each of the plurality of transmitting subscriber units, a received signal strength indicator (RSSI) associated with each of the plurality of transmitting subscriber units, and error counts associated with the transmissions received from each of the plurality of transmitting subscriber units.

18. The device of claim 12, wherein the processor is further configured to send an instruction to a transmitting group on a downlink slot, the instruction identifying an uplink slot, wherein the one or more transmitting subscriber units within the transmitting group perform transmission on the uplink slot in accordance with the instruction.

19. A wireless communication system comprising:

a plurality of receivers;

a plurality of transmitting subscriber units in communication with the plurality of receivers; and a radio network controller (RNC) in communication with the plurality of receivers, the RNC configured to:

store a group database comprising a plurality of transmitting groups, each transmitting group including one or more simultaneously transmitting subscriber units from the plurality of transmitting subscriber units, wherein the plurality of receivers are able to receive transmissions from each of the one or more transmitting subscriber units within each transmitting group such that a resultant Signal to Interference plus Noise Ratio (SINR) associated with the simultaneous transmissions received from each of the one or more transmitting subscriber units within each transmitting group meets a pre-defined SINR threshold at at least one of the plurality of receivers;

in response to a new transmitting subscriber unit requesting to be a member of a transmitting group, receive, by the RNC, signal quality metrics (SQMs) associated with the new transmitting subscriber unit measured at one or more of the plurality of receivers;

step through the plurality of transmitting groups in the group database and test the received SQMs associated with the new transmitting subscriber unit with the resultant SINR associated with each of the plurality of transmitting groups to determine if the new transmitting subscriber unit could be added to at least one of the plurality of transmitting groups without reducing a resultant SINR associated with the at least one of the plurality of transmitting groups below the pre-defined SINR threshold;

assign the new transmitting subscriber unit to the at least one of the plurality of transmitting groups, on the determination that the new transmitting subscriber unit could be added to the at least one of the plurality of transmitting groups without reducing the resultant SINR associated with the at least one of the plurality of transmitting groups below the pre-defined SINR threshold.

20. The system of claim 19, wherein the RNC is further configured to send an instruction to a transmitting group on a downlink slot, the instruction identifying an uplink slot, wherein the one or more transmitting subscriber units within the transmitting group perform transmission on the uplink slot in accordance with the instruction.

* * * * *